United States Patent Office 2,968,995
Patented Jan. 24, 1961

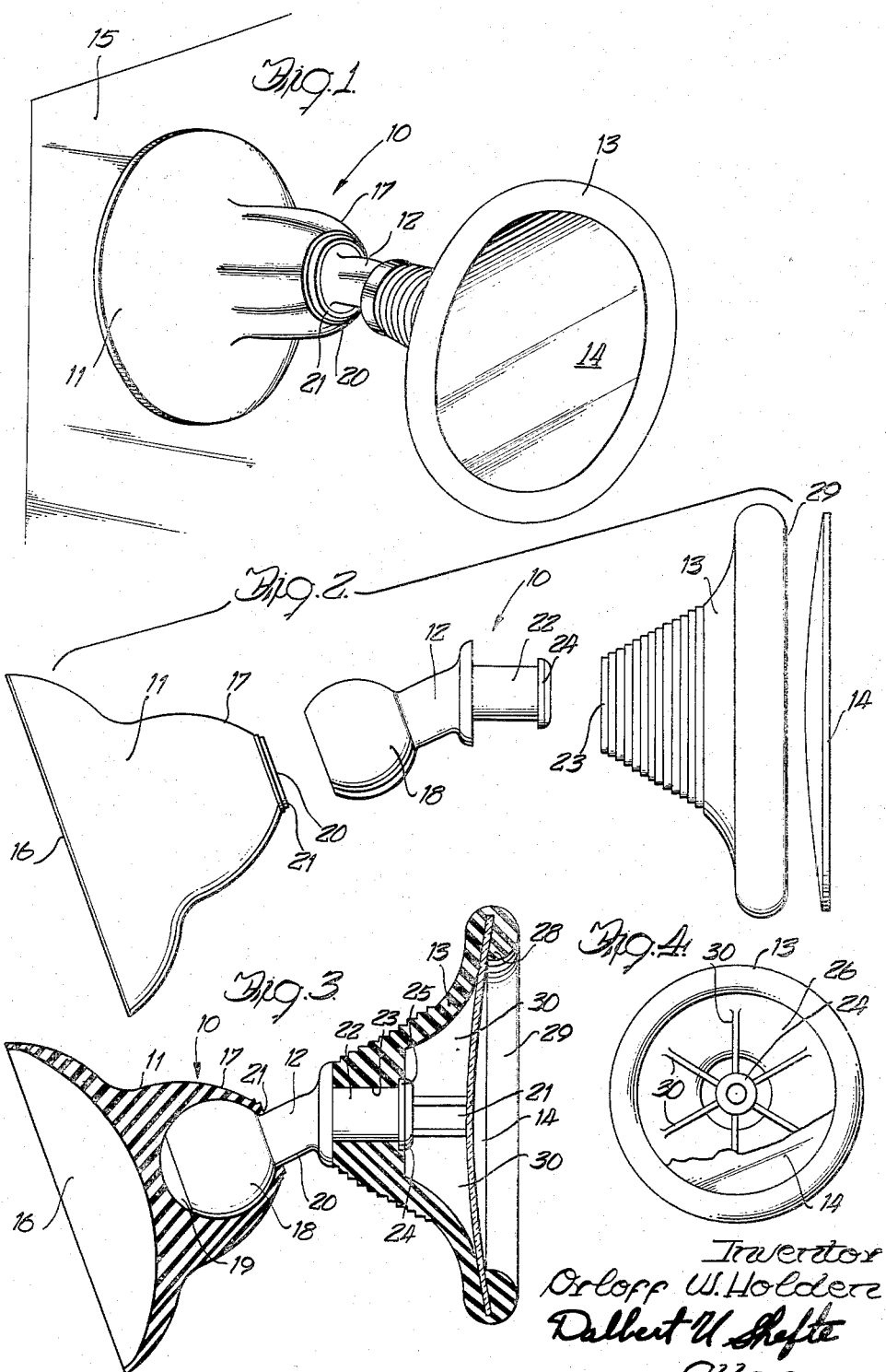

2,968,995

PORTABLE MIRROR

Orloff W. Holden, Chicago, Ill., assignor to Orloff W. Holden and Marguerite H. Holden, doing business as Knickerbocker Rubber Company, a partnership Filed Mar. 8, 1957, Ser. No. 644,808

5 Claims. (Cl. 88—97)

This invention relates to a mirror holder and more particularly to a portable mirror holder having means for adjusting the position of the mirror.

Mirrors in many forms are very commonplace. Especially prevalent are the small magnifying mirrors which are used as beauty aids, shaving aids and for many other similar and dissimilar purposes. A single mirror could be used for many various purposes, but it is ordinarily limited to a particular application by the mirror holder in which it is mounted. Therefore, it is obvious that a universal mirrorholder would be desirable that could be portable for use in a variety of ways, and in which the position of the mirror may be adjusted. Naturally, it would be preferable that the mirror holder be lightweight and compact for easy portability and that it be simple and inexpensive to manufacture.

The present invention provides a mirror holder with the above desirable features as it is directed to a portable mirror holder which permits adjustment of the mirror. The structure is simple and compact for inexpensive manufacture and easy portability. Further, the structure includes a shock-proof mirror mounting to reduce the possibility of cracking or breaking when dropped which, because of the portability, happens relatively often.

It is the general object of the present invention to provide a new and improved portable mirror holder.

Another object of the present invention is to provide a mirror holder in which the position of the mirror can be adjusted.

A further object of the present invention is to provide a mirror holder as described above, having a knob and socket connection for adjustment of the mirror by movement of the knob within the socket.

Still another object of the present invention is to provide a portable mirror holder having a base formed of resilient material with a suction cup portion for removable attachment to a flat surface, and a socket portion formed integrally therein to detachably receive the knob of a mirror mounting member.

A still further object of the present invention is to provide a portable mirror holder as described in the preceding paragraph wherein the knob extends at an angle from a line perpendicular to the face of the mirror to increase adjustability.

Yet another object of the present invention is to provide a portable mirror holder in which a mirror is mounted in a shock-proof manner.

Yet a further object of the present invention is to provide a mirror holder having flanges of resilient material supporting the mirror in a shock-proof manner.

Other and further objects and advantages of the present invention will be apparent from the following description and drawings, in which:

Fig. 1 is a perspective view of a portable mirror holder illustrating an embodiment of the present invention;

Fig. 2 is an exploded side elevational view of the device of Fig. 1;

Fig. 3 is a side elevational view, partially in section, of the device of Fig. 3; and Fig. 4 is a front elevational view of the device of Fig. 1 partially cut away.

While this device is susceptible of embodiments in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

Referring now to the drawings, a mirror holder generally is indicated as 10. This mirror holder consists of a base 11, a body member 12, a mirror mounting member 13, and a mirror 14. The base 11 is formed from a resilient material such as soft rubber and has a suction cup portion 16 which is for attachment of the base to the smooth surface of the wall 15 by the effect of a vacuum created by pressing the suction cup portion against the wall. This vacuum force can be very easily dissipated by lifting an edge of the suction cup portion, and thus the mirror holder 10 is very easily portable and universally applicable to any generally smooth surface.

Also formed in the base 11 is a hollow socket portion 17 shaped to receive a knob 18 extending from the body member 12. The suction cup portion and socket portion are formed integral with the resilient base to provide a simple one-piece construction. The interior 19 of the socket portion 17 is generally spherical in shape as is the knob 18 and the diameter of the interior 19 is substantially similar to the diameter of the knob so that when the knob is mounted in the socket portion, it can be pivoted therein to adjust the position of the body member and because of the resilient character of the base, the socket portion grasps the knob and holds it in whatever position it has been pivoted. The opening 20 of the socket is of a diameter less than the diameter of the interior of the socket portion so that the knob will be retained within the socket portion. To mount the knob in the socket portion, the lip 21 surrounding the opening must be forcibly displaced. This removable knob construction permits the portability of the mirror without removal of the base. Thus the base could serve as a storage holder for a hand mirror when the mirror is not in use. The body member 12 is further provided with a lug 22 extending therefrom. The lug is slightly larger than the hole and the mirror mounting member is formed of a resilient material so that a friction fit results when the lug is forced into the hole, the mirror mounting member thereby being firmly attached to the body member 12, for engagement in a hole 23 of the mirror mounting member 13. The lug 22 has an enlarged end 29 which, when forced through the hole 23, will seat against a shoulder 25 in the recess 26 of the supporting mirror mounting member to yieldably resist withdrawal of the lug. To limit the insertion of the lug in the hole, a rim 27 is provided on the body member 12 adjacent the lug 22, against which the mirror mounting member abuts when the enlarged end 24 of the lug has been forced through the hole 23.

The mirror mounting member 13 is provided with a recess 26 having a peripheral groove 28 therein, adjacent its open end 29 in which a mirror is mounted. As the mirror mounting member is formed from a resilient material, the groove can be distorted sufficiently to receive the mirror and yieldably mount the mirror therein. To support the mirror in the mirror mounting member and provide a shock-proof effect, flanges 30 are formed in the mirror mounting member and extend across the recess. In the embodiment shown, six flanges extend radially into the recess substantially perpendicular to the face of the mirror. The flanges abut the mirror and as they are formed from the same material as the mirror mounting member, they resiliently support and absorb some of the impact caused by dropping or by blows to the face of the mirror. Thus the flanges reduce cracking and breaking of the mirror in a shock-proof manner.

When the knob 18 is inserted in the socket portion 17, the mirror 14 can be adjusted through a wide range of positions by simply pivoting the knob in the socket portion. To increase the range of adjustability, the body member 12 is bent so that the knob 18 extends away from the mirror 14 at an acute angle to a line perpendicular to the face of the mirror. Thus the mirror can be adjusted to positions more nearly approaching the wall 15 than if the body member 12 were straight.

It is apparent that the mirror mounting member 13 including the flanges 30 can be formed of an integral construction so that only three elements are required to provide the present mirror holder 10. Thus a compact and inexpensive structure is possible.

Therefore, the present invention provides a portable mirror which can easily be attached and detached from many common objects having smooth surfaces. Further, the mirror holder is adjustable so that the position of the mirror can be varied as desired. The mirror holder is compact and easily could be designed to be carried in a purse or other similar container, and requires a minimum of material and labor expense to produce.

I claim as my invention:

1. A portable mirror assembly having, in combination, a base adapted to be attached removably to a supporting part and having a socket portion, an elongated body member having a knob on one end portion fitting into said socket portion and movable universally with respect to such portion, a mirror mounting member having a mirror receiving recess in one side and a recess in its opposite side receiving the other end portion of said body member with a fixed angular relation between the members, a mirror fitting in said mirror receiving recess and disposed generally normal to said axis, said end portions of said body member being disposed at an obtuse included angle relative to each other to increase the range of angular disposition of said mirror relative to said base beyond the range afforded by said knob and socket portion alone.

2. A portable mirror assembly having, in combination, a base adapted to be attached removably to a supporting part, a body member, ball and socket portions formed on said base and said body member and interfitting with each other for support of the body member on the base while permitting adjustment of the same relative to each other, a mirror mounting member of resiliently flexible material secured on one side to said body member and having a recess opening from the opposite side and terminating in a flexible lip portion which defines a peripheral groove, a generally flat mirror fitting in said groove and behind said lip portion, and resiliently flexible ribs formed integral with said mounting member in said recess thereof and disposed substantially perpendicular to said mirror with their outer edges engaging the inner side of the mirror to hold the same against said lip portion and provide a shock-resistant support for the mirror, said lip portion being resiliently flexible to permit removal and insertion of said mirror.

3. A portable mirror holder, comprising: a base removably mountable on an object and having a resilient socket portion; a body member having a knob at one end removably insertable in said socket portion for adjustable attachment of said body member to said base, said body member having a lug extending from its other end, said lug having an enlarged outer end; a mirror; a mirror mounting member including a recess receiving said mirror and defined by a portion in engagement with the mirror for support thereof; and a lug engaging portion on said mounting member having a lug receiving opening communicating with said recess and having a shoulder surrounding the recess end of the opening against which the enlarged end of the lug of the support abuts when inserted in the opening to secure the mirror mounting member on the body member.

4. A portable mirror assembly having, in combination, a base adapted to be attached removably to a supporting part, a mirror mounting member of resiliently flexible material mounted on one side of said base for adjustment relative thereto and having a recess opening from the opposite side and terminating in a flexible lip portion which defines a peripheral groove, a generally flat mirror fitting in said groove and behind said lip portion, and resiliently flexible ribs formed integral with said mounting member in said recess thereof and disposed substantially perpendicular to said mirror with their outer edges engaging the inner side of the mirror to hold the same against said lip portion and provide a shock-resistant support for the mirror, said lip portion being resiliently flexible to permit removal and insertion of said mirror.

5. A portable mirror holder, comprising: a base removably mountable on an object and having a resilient socket portion; a body member having a knob at one end removably insertable in said socket portion for adjustable attachment of said body member to said base, said body member having a lug extending from its other end, said lug having an enlarged outer end; a mirror mounting member having a mirror engaging portion which has a recess with a peripheral groove adjacent its open end for mounting of a mirror therein; resilient mirror supporting flanges attached to the recessed portion and extending into the recess, said flanges being perpendicular to and in engagement with the mirror for shock-proof support thereof; and a lug engaging portion having a lug receiving opening communicating with the recess and having a shoulder surrounding the recess end of the opening against which the enlarged end of the lug of the support abuts when inserted in the opening to secure the mirror mounting member on the body member.

References Cited in the file of this patent

UNITED STATES PATENTS

| Number | Name | Date |
|---|---|---|
| 816,588 | Moore | Apr. 9, 1906 |
| 918,724 | Austin | Apr. 20, 1909 |
| 947,751 | Long et al. | Jan. 25, 1910 |
| 952,495 | Austin | Mar. 22, 1910 |
| 963,264 | Austin | July 5, 1910 |
| 1,147,102 | Knabe | July 20, 1915 |
| 1,985,502 | Isenberg | Dec. 25, 1934 |
| 2,091,203 | Hay | Aug. 24, 1937 |
| 2,112,316 | Turner | Mar. 29, 1938 |
| 2,146,859 | Seklehner | Feb. 14, 1939 |
| 2,307,568 | Colbert | Jan. 5, 1943 |
| 2,742,251 | Udvardy | Apr. 17, 1956 |
| 2,763,188 | Bertell | Sept. 18, 1956 |
| 2,893,644 | Holden | July 7, 1959 |